United States Patent [19]

Kamerman et al.

[11] Patent Number: 5,164,942
[45] Date of Patent: Nov. 17, 1992

[54] ANTENNA CONTROL FOR A WIRELESS LOCAL AREA NETWORK STATION

[75] Inventors: Adriaan Kamerman, Nieuwegein; Hans van Driest, Bilthoven, both of Netherlands

[73] Assignee: NCR Corporation, Dayton, Ohio

[21] Appl. No.: 633,692

[22] Filed: Dec. 24, 1990

[30] Foreign Application Priority Data

Sep. 6, 1990 [GB] United Kingdom ............... 9019489

[51] Int. Cl.5 ............................................. H04J 3/24
[52] U.S. Cl. ................................... 370/94.1; 370/85.2
[58] Field of Search .................... 370/85.1, 85.2, 85.3, 370/94.1; 340/825.5

[56] References Cited

U.S. PATENT DOCUMENTS

| | | | |
|---|---|---|---|
| 4,409,592 | 10/1983 | Hunt | 340/825.5 |
| 4,661,902 | 4/1987 | Hochsprung et al. | 395/800 |
| 4,979,168 | 12/1990 | Courtois et al. | 370/94.1 |
| 5,046,066 | 9/1991 | Messenger | 370/94.1 |

FOREIGN PATENT DOCUMENTS 0318665 9/1988 European Pat. Off. .
0343538 5/1989 European Pat. Off. .

OTHER PUBLICATIONS

J. L. Hammond and J. P. O'Reilly, Performance Analysis of Local Computer Networks (Addison-Wesley Publishing Company), 1986, pp. 304–337.

*Primary Examiner*—Curtis Kuntz
*Assistant Examiner*—T. Ghebretinsae
*Attorney, Agent, or Firm*—Elmer Wargo

[57] ABSTRACT

A local area network station (12) includes a transceiver (20) adapted to transmit and receive signals using electromagnetic radiation on a wireless communication link. The station (12) utilizes a CSMA/CD communications controller (22) in a CSMA/CA (collison avoidance) technique wherein deferred data frames are transmitted after a random number of backoff slots periods. A plurality of antennas (14, 16) is employed, with the antenna having the best receive conditions being selected for reception of a data frame. The antennas having a slotting control (200) which is synchronized with the backoff slotting to provide a short carrier detect time and hence high throughpout.

9 Claims, 7 Drawing Sheets

ANTENNA CONTROL FOR A WIRELESS LOCAL AREA NETWORK STATION

CROSS REFERENCE TO RELATED APPLICATIONS

The application is related to U.S. application Ser. No. 633,691 which was filed on Dec. 24, 1990, for a LOCAL AREA NETWORK HAVING A WIRELESS TRANSMISSION LINK, with this related application being filed by Kamerman et al. and being assigned to the same assignee as the present invention.

BACKGROUND OF THE INVENTION

This invention relates to local area networks (LANs) wherein a plurality of stations communicate with one another over a transmission medium for the transmission of digital data.

Various methods are known for sharing network communication channels or links among stations in a local area network. One widely used method is known as CSMA/CD (carrier sense multiple access with collision detection). According to this known method, a station wishing to transmit a message listens until the transmission channel is idle before commencing to transmit an information packet. Furthermore, the station continues to listen to the channel after commencing a transmission, and if a collision is detected, that is, more than one station has commenced to transmit an information packet, any station which detects such collision terminates its message transmission and transmits a jam pattern (or garble) such that all other stations can be informed of the collision, terminate message transmission, and wait a random time before attempting to commence a further message transmission.

The CSMA/CD protocol is the subject of an international (ISO) standard and corresponding IEEE Standard, No. 802.3, and has become a generally used protocol for LANs utilizing wired connections for transmission between the stations. In consequence, CSMA/CD LAN controller chips have become widely commercially available. Several manufacturers produce such chips, complying with the IEEE 802.3 standard. An example is the Intel 82586 LAN coprocessor chip, available from Intel Corporation of Santa Clara, California, USA. Such chips provide various facilities useful in LANs, such as data rate range and backoff algorithm and configurable parameters such as slot time duration, retry counter offset and limit, and interframe spacing time.

However, LANs using wired interconnections have the disadvantage that extensive cabling is required to interconnect the stations. The provision of such cabling is generally inconvenient, and gives rise to inflexibility if it is desired to alter the physical locations of the stations. It has been proposed to utilize a wireless transmission link operating at radio frequencies to replace the cabling interconnections of a LAN. However, if only a single radio channel is to be utilized for such a LAN, the widely accepted CSMA/CD protocol cannot generally be applied since a station cannot generally receive (or listen) while it is transmitting.

European Patent Application No. 0 064 818 discloses a wired LAN which utilizes a data collision avoidance method. Each station with a data packet ready for transmission monitors the activity of the communications channel. If activity on the channel is detected, the station waits until the channel is idle and then introduces a random wait, at the end of which the transmission is effected if the channel is still idle.

SUMMARY OF THE INVENTION

It is an object of the present invention to provide a LAN station suitable for use with a single channel electromagnetic wave transmission link, which is of simple and inexpensive construction, while providing data communication with high throughput.

Therefore, in a preferred embodiment of the present invention, there is provided a local area network station comprising:

transceiver means to operate on a wireless electromagnetic wave transmission channel (hereinafter referred to as channel) having a plurality of antennas;

communication control means operative when said channel is active to defer transmission of a data frame (referred to as a deferred data frame) for a random number of backoff time periods after the channel has become inactive;

antenna switch means to select one of said plurality of antennas for operative connection to said transceiver means; and synchronizing means to control said antenna switch means to provide antenna slot periods having durations equal to said backoff slot time periods, and also to synchronize the start of data frame transmissions with the start of said antenna slot time periods.

Another aspect of this invention relates to a a method of transmitting data frames in a local area network including a plurality of local area network stations, each station comprising transceiver means adapted to operate on a wireless transmission channel and a plurality of antennas, including the steps of:

(a) determining, in each station, if said transmission channel is active and, if so, deferring transmission of a data frame by that station for a random number of equal duration backoff slot time periods after said transmission channel has become inactive;

(b) providing, in each station, switching means adapted to connect said antennas in turn to said transceiver means, each for an antenna slot time period equal to one of said backoff slot time periods; and (c) synchronizing said antenna slot time periods for all of said station in said network.

It will be appreciated that a local area network station according to this invention has a simple and inexpensive construction and is suitable for a single channel electromagnetic wave transmission link, resulting from the ability to use commercially available CSMA/CD controller chips as communication controller means, and provides a high data throughput resulting from the use of a plurality of antennas synchronized with the CSMA/CD backoff slots since the synchronization means provides a low carrier detect time and hence high data throughput, as will be explained more fully hereinafter.

One embodiment of the present invention will now be described by way of example, with reference to the following description, claims and drawing.

DESCRIPTION OF THE PREFERRED EMBODIMENT

Figure 1:
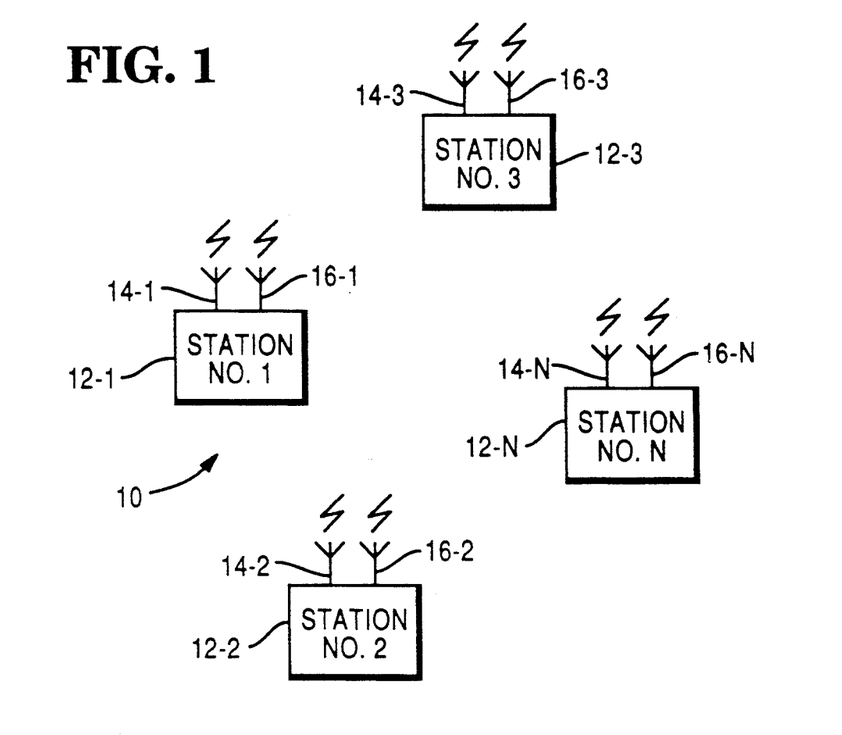
FIG. 1 is a diagram of a radio LAN.

Referring first to FIG. 1, there is shown a radio local area network (radio LAN) 10 including a plurality N of stations 12, shown individually as 12-1 to 12-N. Each station has two antennas 14 and 16, which are polarized in different directions and are shown individually as 14-1 to 14-N and 16-1 to 16-N. Alternatively, the two antennas 14 and 16 may be oriented in different directions.

Communication among the stations 12 takes place on a single radio channel, and preferably uses spread spectrum communication technology. In the indoor radio LAN of the preferred embodiment, the 902-928 MHz band is utilized. Another suitable frequency band lies around 2.5 GHz.

Figure 2:
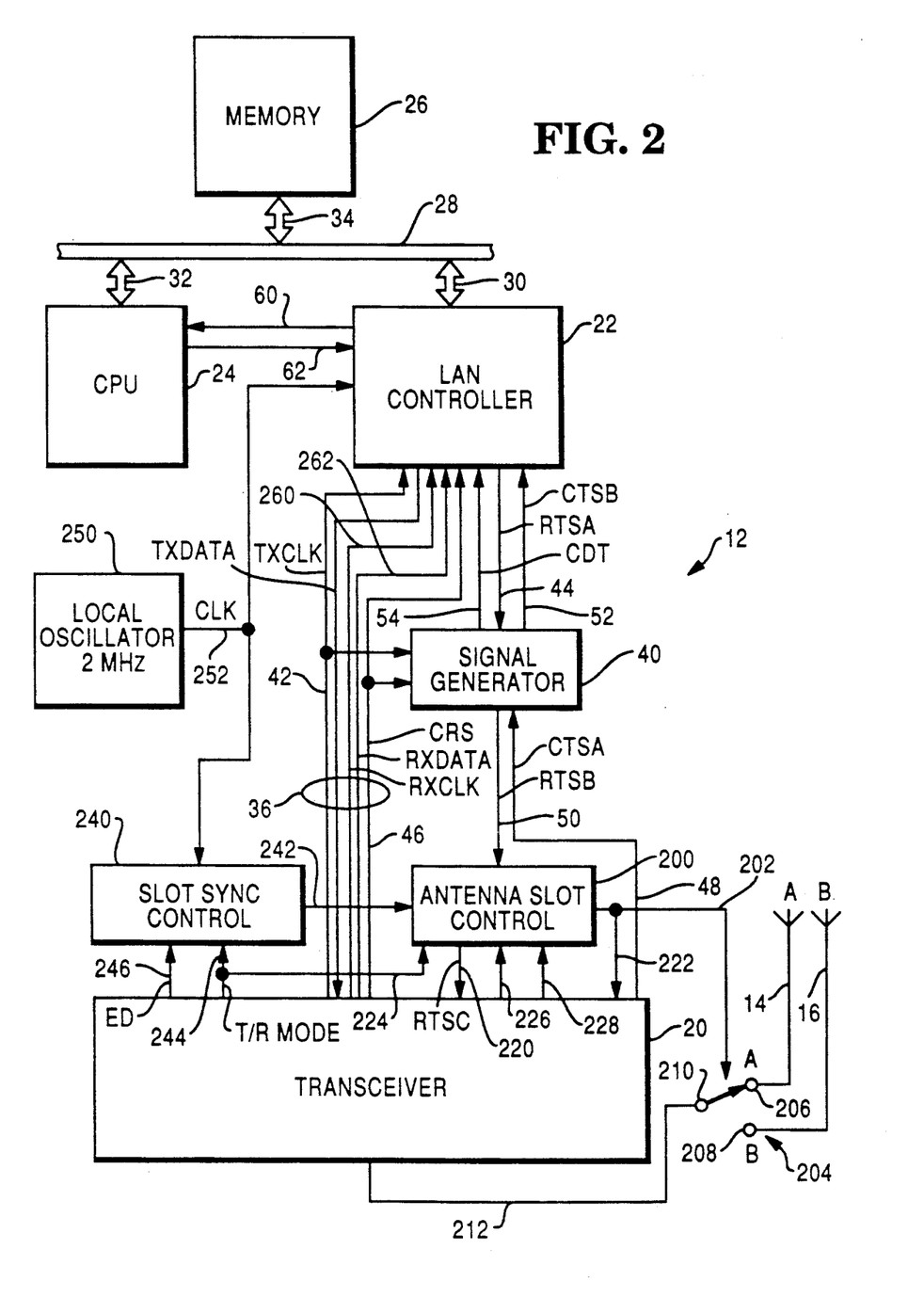
FIG. 2 is a block diagram of a typical station utilized in the LAN shown in FIG. 1.

Referring now to FIG. 2, there is shown a block diagram of the components of a typical station 12, illustrating the blocks thereof which are pertinent to the present invention. The station 12 includes a transceiver 20, a LAN controller 22, a central processor unit (CPU) 24, and a memory 26. A local bus 28 is connected to the LAN controller 22 by a bus 30, to the CPU 24 by a bus 32, and to the memory 26 by a bus 34. The LAN controller device is a commercially available LAN controller device, suitable for the CSMA/CD (carrier sense multiple access with collision detection) protocol. In the preferred embodiment, the LAN controller 22 is an Intel 82586 LAN coprocessor chip, available from Intel Corporation of Santa Clara, California, U.S.A.

The transceiver 20 and LAN controller 22 are interconnected by a bus 36 which carries data and control signals. Also included in the station 12 are a signal generator circuit 40 and an antenna slot control circuit 200 which are interposed between the transceiver 20 and the LAN controller 22. The signal generator circuit 40 receives transmit clock pulses TXCLK from the transceiver 20 over a line 42 and a request-to-send signal RTSA from the LAN controller 22 over a line 44.

The signal generator circuit 40 also receives a carrier sense signal CRS and a clear-to-send signal CTSA from the transceiver 20 over lines 46 and 48 respectively. The TXCLK pulses on the line 42 and the CRS signal on the line 46 are also applied directly to the LAN controller 22.

The signal generator circuit 40 provides an output request-to-send signal RTSB over a line 50 connected to the antenna slot control circuit 200, an output clear-to-send signal CTSB over a line 52 connected to the LAN controller 22, and an output simulated collision detect signal CDT over a line 54 also connected to the LAN controller 22. The functions of the various signals applied to, and provided by, the signal generator circuit 40 will be explained in detail hereinafter.

The LAN controller 22 is connected to the CPU 24 over signal lines 60 and 62, whereby control signals (such as interrupts) may be passed between the CPU 24 and the LAN controller 22.

The antenna slot control circuit 200 has an output connected over a line 202 to a control input of a switch 204 which has terminals 206 and 208 coupled respectively to the antennas 14 and 16. For convenience, antennas 14 and 16 will also be referred to as antennas A and B, respectively. A further terminal 210 of the switch 204 is coupled to the transceiver 20 over a line 212 which transmits RF signals between the transceiver 20 and the antennas 14 and 16. The antenna slot control circuit 200 provides a request-to-sent signal RTSC on an output line 220 connected to the transceiver 20. Also, the output line 202 is connected to the transceiver 20 over a line 222 to provide a signal to the transceiver 20 identifying the particular antenna A or B which is operative.

The antenna slot control circuit 200 also receives an input over a line 224 identifying whether the transceiver 20 is in the transmit mode or the receive mode and further control signals (to be described) over lines 226 and 228 coupled to the transceiver 20.

Also included in the station 12 is a slot sync control circuit 240 which provides a synchronizing control signal over a line 242 to the antenna slot control circuit 200. The slot sync control circuit 240 also receives the transmit/receive mode signal T/R MODE from the transceiver 20 over a line 244 and a control signal ED (to be described) over a line 246 also coupled to the transceiver 20. A 2 MHz local oscillator 250 provides locally generated clock signals (CLK) at a frequency of 2 MHz over a line 252 to the slot sync control circuit 240 and to the LAN controller 22.

The transceiver 20 provides receive clock signals RXCLK and received data signals RXDATA over respective lines 260 and 262, included in the bus 36 connected to the LAN controller 22.

It should be understood that the LAN controller 22 operates according to the CSMA/CD aforementioned IEEE 802.3 standard. As previously mentioned, the LAN controller 22 is a commercially available LAN controller device. The operation of such a controller in accordance with usage in a CSMA/CD system will now be briefly described by way of background information, helpful as an aid to understanding the present invention. Thus, where used in a wired LAN utilizing the CSMA/CD protocol, the controller constantly monitors link activity. Whenever it senses a carrier signal on the link, the controller defers passing a data frame by deferring any pending transmission. After the carrier signal goes inactive, the controller continues to defer for an interframe spacing time configurable to a certain number of clock cycles. If at the end of that time it has a frame waiting to be transmitted, transmission is initiated independently of the sensed carrier. After transmission has been started, the controller attempts to transmit the entire frame. In the normal case, frame transmission is completed, and the host processor is notified. However, transmission may be terminated prematurely. This occurs, for example, when the collision detect input to the controller is activated, as will now be described. When the controller has finished deferring and has started transmission, it is still possible to experience link contention. This situation is called a collision and it is generally detected by the transceiver, which then activates the collision detect input to the controller. The controller informs the other stations of a collision by transmitting a jam pattern, which is detected by the other stations in the LAN. The dynamics of collision handling are largely determined by a so-called "slot time". The slot time is configurable and normally based on the maximum end to end round trip delay time of the network plus jam time. Slot time is important because it is the worst case time to detect a collision. After a collision, the controller attempts to retransmit the frame after a so-called backoff time, unless the number of retransmission attempts has exceeded the maximum allowed. The controller calculates the backoff time according to the IEEE 802.3 standard: backoff is an integral number of slot times. It is a random number, from 0 to a maximum value. The maximum value is $2^R-1$), where R is the minimum between 10 and the number of retransmission attempts. This range can be extended using an "accelerated contention resolution" mechanism. The application of this capability gives a range from 0 to a maximum value of $2^{R+K}-1$, where K is the retry counter offset and $R+K$ has a maximum value of 10. It should be understood that the controller includes a retry counter which is incremented after each retransmission attempt. If retransmission is successful, the user is notified. If the number of retries exceeds the maximum, an error is reported.

Returning to the single channel radio LAN 10, FIG. 1, difficulties arise in any attempt to apply a CSMA/CD protocol since a station 12 which is transmitting cannot receive a signal, thereby rendering the detection of a collision difficult or impossible. However, it would be feasible to apply a CSMA technique without collision detection if the risk of collisions were small. This requires that any carrier activity has to be detected very quickly to minimize the probability that different stations start transmitting simultaneously or at times very closely spaced. The carrier detect time can be regarded as a period during which collision can occur, and it should be small compared to the message duration. In a radio LAN, the carrier detect time has several contributions, namely transceiver delay (transmitter and receiver) and through-the-air delay. The main part of the carrier detect time (of about 30 microseconds) is contributed by the receiver, resulting from functions such as automatic gain control, correlator filter, and carrier-signal detection. The through-the-air delay at indoor distances below 300 meters is small (less than 1 microsecond). This carrier detect time is relatively long compared with a typical carrier detect time of about 1 to 6 microseconds for a wired LAN. Thus, the application of a straightforward CSMA technique for a radio LAN has disadvantages.

Referring again to FIG. 2, the signal generator circuit 40 is effective to simulate a collision, thereby providing a CDT (collision detect) signal on the line 54 when a data frame transmission has been deferred, even though no actual collision has occurred. Thus, transmission of the deferred data frame is initiated only after the lapse of a random backoff time. In this manner, the risk of collisions resulting from stations 12 commencing to transmit at simultaneous or closely spaced times is considerably reduced.

Figure 3A:
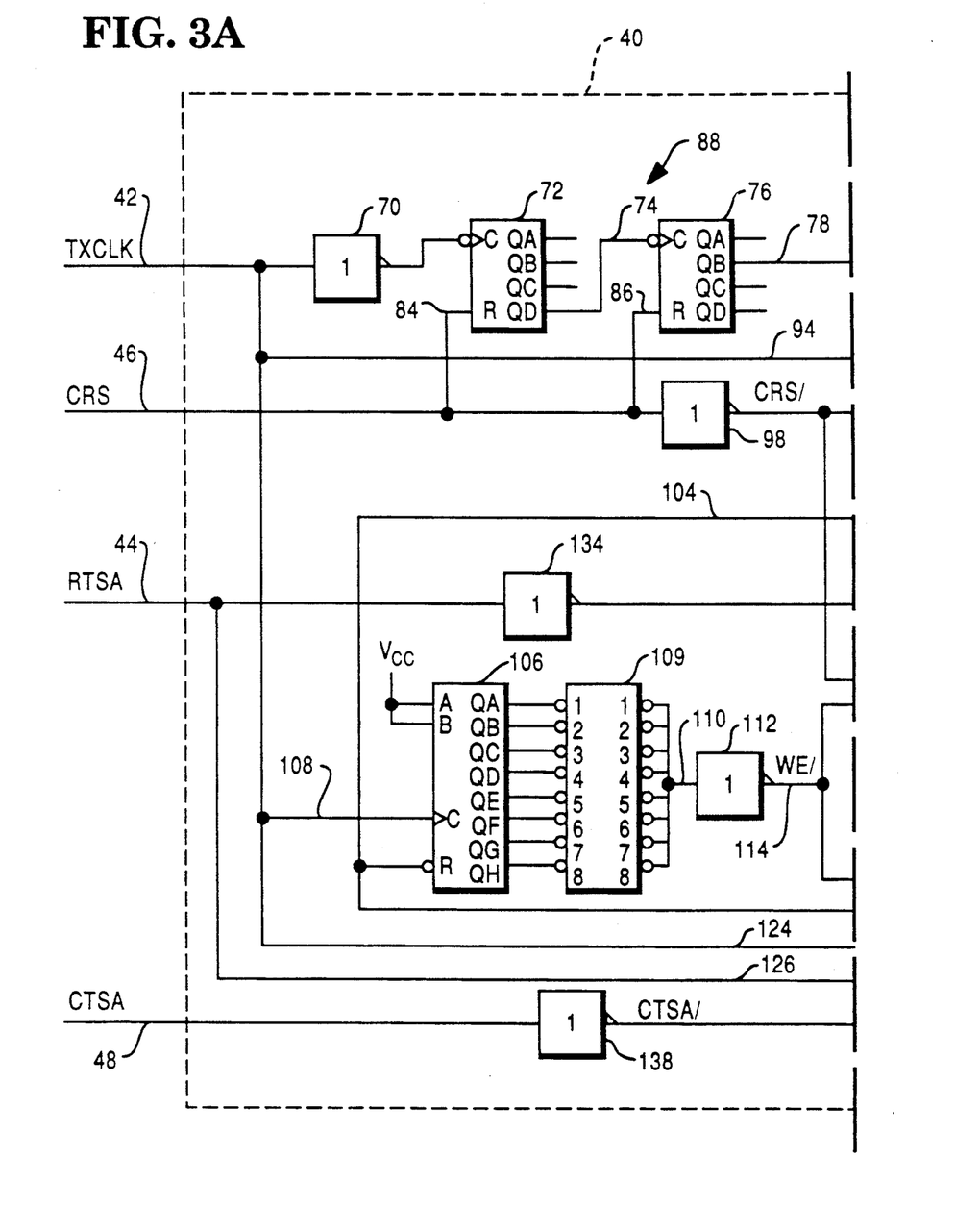
FIGS. 3A and 3B, taken together, form a circuit diagram of a signal generator circuit used in the station shown in FIG. 2.
Figure 3B:
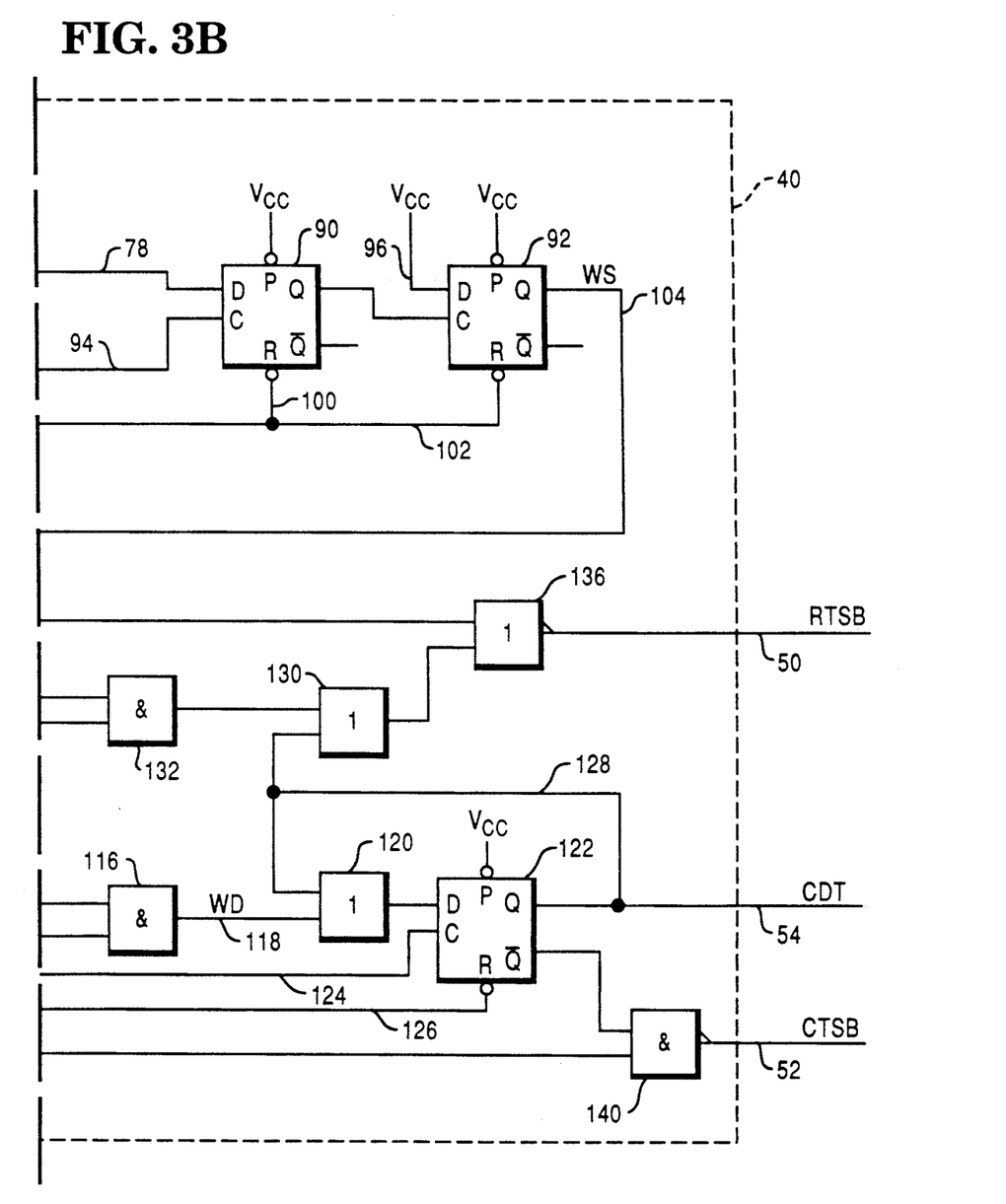

With the above in mind, the signal generator circuit 40 will now be described with reference to FIGS. 3A and 3B. The input line 42, which carries the TXCLK pulses is connected to an inverter 70 the output of which is connected to the count input of 4-bit counter 72 having its QD output connected over a line 74 to a 4-bit counter 76, the QB output connected over a line 74 to a 4-bit counter 76, the QB output of which is connected over a line 78 to the D input of a D-type flip-flop 90. The input line 46, which provides the carrier sense signal CRS, is connected over lines 84 and 86 to reset inputs of the counters 72 and 76, respectively. It should be understood that the devices 70, 72, and 76 together form a timer, indicated generally as 88, such that an active signal appears at the QB output of the counter 76 after a time corresponding to 32 TXCLK periods from the falling edge of the CRS signal.

The Q output of the flip-flop 90 (FIG. 3B) is connected to the clock input of a D-type flip-flop 92. The clock input of the flip-flop 90 is connected over a line 94 to the input line 42. The D input of the flip-flop 92 is connected to a supply voltage $V_{CC}$. The input line 46 is connected to an inverter 98, the output of which is connected to the reset inputs of the flip-flops 90 and 92 over lines 100 and 102, respectively. With this arrangement, the Q output of the flip-flop 92 provides a window start signal WS on an output line 104.

The line 104 is connected to the reset input of an 8-bit shift register 106 (FIG. 3A), the clock input of which receives the TXCLK pulses over a line 108 connected to the input line 42. The outputs of the shift register 106 are connected to respective inputs of a header 109, having its outputs commonly connected to a line 110, whereby a desired one of the shift register outputs may be selected to apply a correspondingly delayed signal to the output line 110. The line 110 is connected to an inverter 112, on the output 114 of which an active low window end signal WE/ is provided. The WS and WE/ signals on the lines 104 and 114 are applied to an AND gate 116, the output of which provides a window signal WD on a line 118.

The window signal WD on the line 118 is applied to an OR gate 120, the output of which is connected to the D input of a D-type flip-flop 122, the Q output of which is connected to the output line 54 to provide the simulated collision detect signal CDT. The clock input of a flip-flop 122 is connected over a line 124 to receive the TXCLK pulses from the input line 42. The reset input of the flip-flop 122 is connected over a line 126 to the input line 44 which carries the request-to-send signal RTSA.

The Q output of the flip-flop 122 (FIG. 3B) is also connected via a line 128 to an input of the OR gate 120 and to an input of an OR gate 130. Another input of the OR gate 130 is connected to the output of an AND gate 132 which has inputs connected respectively to the output of the inventer 98 and to the output of the inverter 112.

The input line 44 is also connected to an inverter 134, the output of which is connected to an input of a NOR gate 136, a second input of which is connected to the output of the OR gate 130. The output of the NOR gate 136 is connected to the output line 50 to provide the request-to-send signal RTSB.

The input line 48 (FIG. 3A) is connected to an inverter 138 the output of which is connected to an input of a NAND gate 140, a second input of which is coupled to the Q/ output of the flip-flop 122. The output of the NAND gate 140 (FIG. 3B) is connected to the output line 52 to provide the clear-to-send signal CTSB.

The operation of the signal generator circuit 40 (FIGS. 3A and 3B) will now be briefly described. When the carrier sense signal CRS on the line 46 drops, the timer 88 provides an active output signal on the line 78 after 32 TXCLK pulse periods, corresponding to the interframe spacing (IFS) time. The output of the timer 88 is synchronized by the flip-flop 90 to eliminate any possible voltage spikes. The CRS/ signal at the output of the inverter 98 ensures that the flip-flops 90 and 92 are enabled when the signal CRS drops. The output of the flip-flop 92 provides the window start signal WS at a time 32 TXCLK pulse periods after the CRS signal drops. When the window start signal WS on the line 104 is inactive, it resets the shift register 106. When the window start signal WS becomes active, it is delayed and inverted by the shift register 106, header 109, and inverter 112 to provide an inverted window end signal WE/ on the line 114. This WS signal on the line 104 and the WE/ signal on the line 114 are combined in an AND gate 116 to provide the window signal WD which is active for a predetermined number N of TXCLK pulse periods, where N lies between 1 and 8, and is selected by selecting a desired one of the outputs QA to QH of the shift register 106 by connecting the corresponding equal numbered pins on the header 109. In the preferred embodiment, the output QD of the shift register 106 is selected, whereby, when the window signal WD has become active, it stays active for four TXCLK periods.

If the signal RTSA on the line 44 becomes active during the active state of the window signal WD, flip-flop 122 provides the signal CDT on the line 54, simulating a collision. The feedback from the flip-flop 122 on the line 128 to the OR gate 120, ensures that when the signal CDT becomes active, it stays active until the falling edge of the signal RTSA (after the controller 22 has transmitted the preamble and jam pattern).

The inverter 138 and NAND gate 140 ensure that the signal CTSB follows the signal CTSA as long as the signal CDT is not active (no simulated collision). When CDT becomes active, then the signal CTSB also becomes active, independently of the signal CTSA.

The signal RTSB is produced by utilizing the inverter 134, the AND gate 132, the OR gate 130, and the NOR gate 136. Thus, the signal RTSB does not follow the signal RTSA if the signal CDT is active (simulated collision), thereby preventing transmission of the preamble and jam pattern. Also, since the signal CTSA/ from the inverter 138 is applied to the NAND gate 140 together with the output of the flip-flop 122, the signal CTSB follows the signal CTSA as long as CDT is inactive.

It will thus be appreciated that where another station transmits a data frame, but the station 12 (FIG. 2) does not request transmission of a data frame, the window signal WD is generated after the 32-bit IFS (interframe spacing) time, but since the station 12 is not requesting to transmit a data frame, the window signal WD has no significant effect. Where the station 12 requests transmission of a data frame, but the other stations are inactive, the CRS signal remains at a low level. Under these conditions, the window signal WD is not generated. The request-to-send signal RTSA causes the signal generator circuit 40 to provide the request-to-send signal RTSB to the antenna slot control circuit 200. Where another station is transmitting a data frame, such that the signal CRS in the station 12 is active at a time when, in the station 12, the LAN controller 22 is notified that the station 12 desires to transmit a data frame, transmission of the data frame in the station 12 is deferred by the controller 22. After the signal CRS becomes active, and following the elapse of the interframe spacing time IFS, the window signal WD is generated in the signal generator circuit 40 in the manner described hereinabove with reference to FIGS. 3A and 3B. Since the controller 22 also activates the signal RTSA at this time, the signal generator circuit 40 activates the signal CDT on the line 54, to simulate a collision. This causes the controller 22 to stop its transmission after completion of sending the preamble and jam patterns. However, these patterns are not transmitted by the station 12 since the signal RTSB is not generated if a collision is simulated. Thus, the controller 22 is conditioned to the backoff mode, and calculates its backoff time based on a random number of backoff slot times, as discussed hereinabove. After the random backoff slot times have expired, the controller 22 attempts to transmit the deferred frame.

Figure 4:
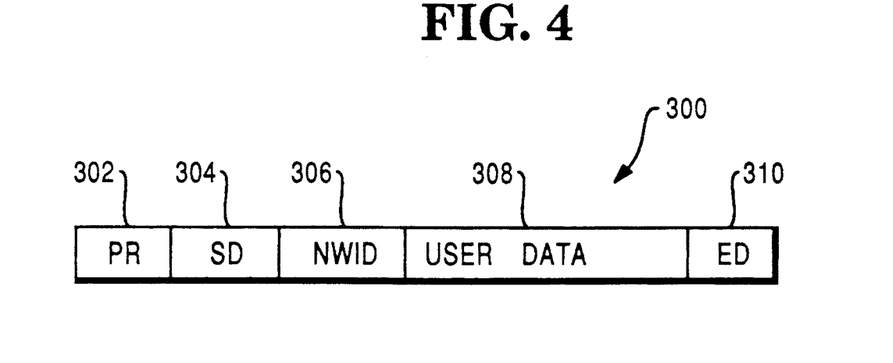
FIG. 4 (shown on the sheet including FIG. 1) is a diagram of a typical data frame transmitted in the LAN.

Referring briefly to FIG. 4, there is shown a diagram of a typical data frame 300 transmitted in the LAN 10. The data frame 300 includes a preamble (PR) portion 302 which allows the station receivers to adjust their parameters such as gain to the best values, a start delimiter portion (SD) 304, a network identification portion (NWID) 306, which identifies the particular network 10 in which the data frame 300 is transmitted, a user data portion 308 containing the transmitted data, including source and destination station addresses, and an end delimiter portion (ED) 310.

Figure 5:
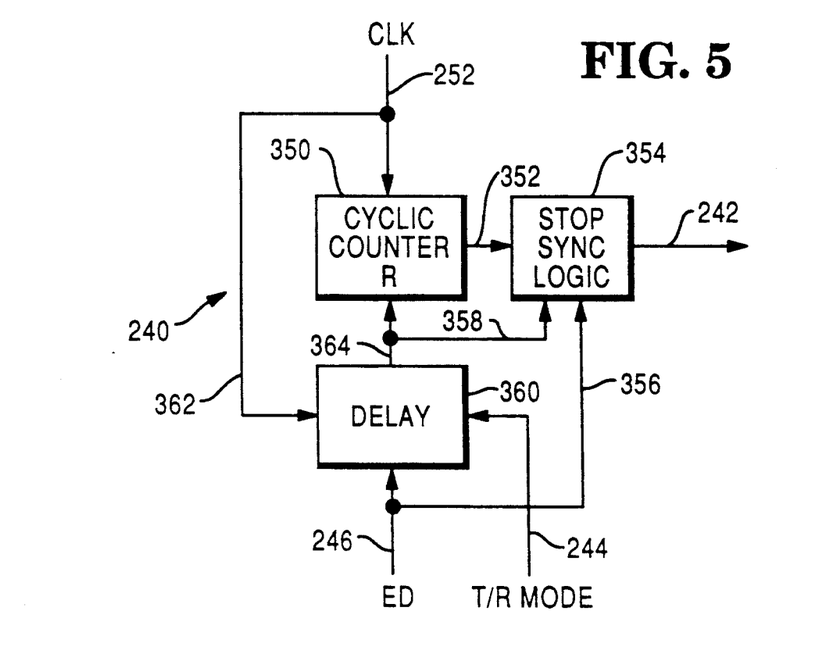
FIG. 5 is a block diagram of the slot sync control circuit shown in FIG. 2.

Referring now to FIG. 5, there is shown a block diagram of the slot sync control circuit 240 (FIG. 2). The 2 MHz clock pulses on the line 252 are applied to a cyclic counter 350 which has an output signal on a line 352, normally occurring once every 40 microseconds (80 CLK pulses). The line 352 is connected to a stop sync logic circuit 354 which is enabled, thereby blocking pulses on the line 352, in response to a signal on a line 356, and is disabled, thereby passing pulses on the line 352, in response to a signal on a line 358. The stop sync logic circuit 354 has an output connected to the line 242 and is effective to pass the output signal from the counter 350 to the line 242 when enabled and to inhibit the passing of such output signal when disabled. Also included in the slot sync control circuit 240 is a delay circuit 360 which receives the CLK pulses over an input line 362 and has an output connected to a reset input of the counter 350 over a line 364, which is also connected to the line 358. The delay circuit 360 also has a first input connected to the line 244, which carries the T/R MODE signal, identifying whether the station is in transmit mode or receive mode, and a second input connected to the line 246 which carries a signal when the end delimiter ED (FIG. 4) of a data frame is detected by the transceiver 20. This arrangement provides a selective delay in the resetting of the counter 350, as will be explained hereinafter.

Figure 6:
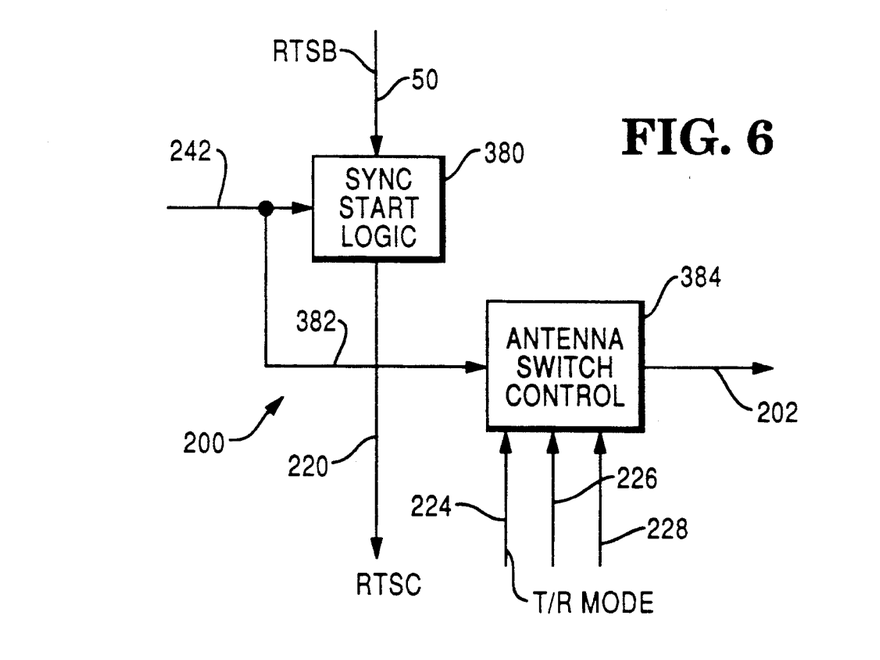
FIG. 6 is a block diagram of the antenna slot control circuit shown in FIG. 2.

Referring now to FIG. 6, there is shown a block diagram of the antenna slot control circuit 200 (FIG. 2). The signal from the slot sync control circuit 240, on the line 242, is applied to a sync start logic circuit 380 which receives, as an input, the request-to-send signal RTSB on the line 50, and provides, as an output, the request-to-send signal RTSC on the line 220 coupled to the transceiver 20. The input line 242 is also connected over a line 382 to an antenna switch control logic circuit 384. The antenna switch control logic circuit 384 also receives, as inputs, the T/R MODE signal on the line 224, an enable switching input signal on the line 226, and a select A/B signal on the line 228, controlling the switch 204 (FIG. 2) to select the antenna A or B.

With the above in mind, it will be appreciated that there has been described thus far a local area network station 12 for a wireless radio LAN, using a CSMA/CA (carrier sense multiple access with collision avoidance) access technique, and utilizing two antennas, namely 14 (antenna A) and 16 (antenna B).

The operation of the described circuitry, which operation will be described hereinafter, handles the control of antenna switching between antennas A and B, and the control of time slotting for CSMA/CA.

The network station 12 can be either in the transmit mode or the receive mode. The switch 204 (FIG. 2) can be in two states, namely state A when antenna A is operative, and state B when antenna B is operative. In the transmit mode, the switch 204 is controlled by the antenna slot control circuit 200 (FIG. 6) to be in state A, that is, the antenna A is always operative for transmission. When the station 12 is not in the transmit mode, it is in the receive mode and as long as carrier detection has not been made (that is, as long as the signal CRS, FIG. 2, is inactive), the station 12 alternates between states A and B, with switching occurring at antenna slot times, defining antenna slot periods which are selected to have equal duration to the backoff slot time periods discussed hereinabove with reference to the LAN controller 22. Also, as will be explained hereinafter, the antenna slot periods are synchronized with the backoff slot periods. The duration of the antenna slot periods is selected to correspond with a time period required for reliable carrier detection. It will be appreciated that the synchronizing provided by the slot sync control circuit 240 and the antenna slot control circuit 200 controls the timing of antenna switching and the start of a transmission.

From the discussion hereinabove, relating to the LAN controller 22, it will be appreciated that the LAN controller 22 can start a transmission of a deferred data frame at the start of any one of a number of different time slots. As mentioned, the circuitry described herein provides synchronization between the transmission. This gives minimum carrier detect time at transmission of a deferred frame and thereby lower collision risks. Similarly, synchronization is also provided between the antenna switching and the start of the transmission of a new (non-deferred) data frame, with the same advantages.

When the station 12 desires to transmit a data frame, the transceiver 20 goes to the transmit mode, and provides a T/R MODE signal on the lines 224, 244 (FIG. 2), representing the transmit mode. Assuming that transmission is granted, there is transmitted the data frame 300 (FIG. 4) containing the preamble PR, start delimiter SD (4 symbols), network ID (16 symbols), the user data symbols and lastly the end delimiter ED (4 symbols). As mentioned, when the station 12 is not in the transmit mode, it is in the receive mode, with an appropriate T/R MODE signal being supplied. When a data frame is received, the beginning of significant data is identified by the detection in the transceiver 20 of the start delimiter SD (FIG. 4). The transceiver 20 sends the user data (RXDATA) to the LAN controller 22 over the line 262 (FIG. 2). The end of the received data frame is determined by detection of the end delimiter ED, which is constituted by the four symbols following the last data bit. The ED detect signal on the line 246 is utilized in resetting the cyclic counter 350.

Figure 7:
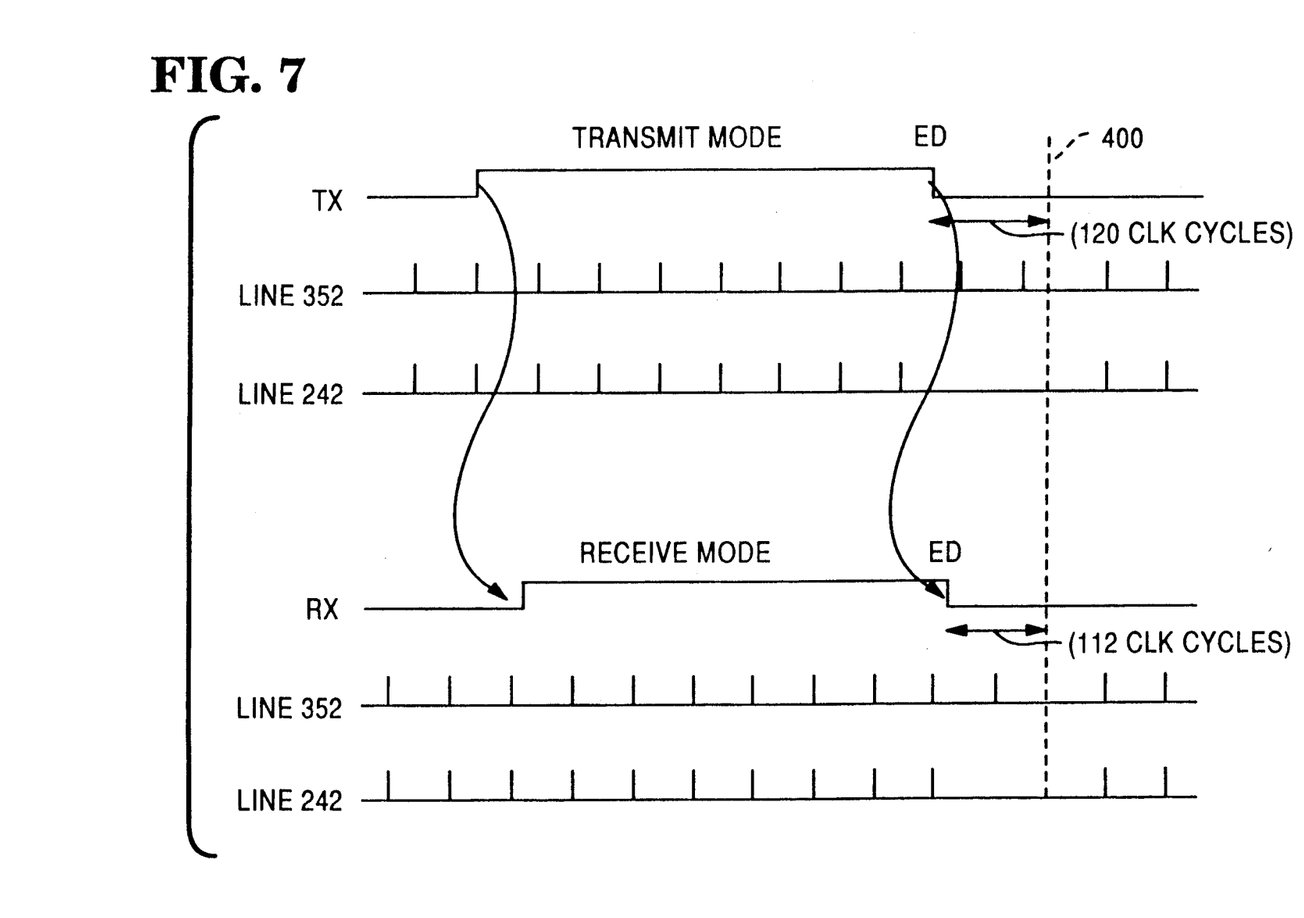
FIG. 7 shows waveform diagrams illustrating synchronization in transmit and receive modes of the station.

It will now be described, referring particularly to FIGS. 5 and 7, how the slot sync control circuit 240 is reset after carrier activity. In FIG. 7, the upper three waveforms relate to a station 12 in the transmit mode, and the lower three waveforms relate to a station in the receive mode. In particular, the first and fourth waveforms represent the transmission and reception of a data frame, respectively; the second and fifth waveforms represent signals on the line 352 (FIG. 5) during transmission and reception of a data frame, respectively; and the third and sixth waveforms represent the signals on the line 242 (FIGS. 5 and 6) during transmission and reception of a data frame, respectively.

When a station 12 has transmitted the aforementioned, reset of the slot sync control circuit 240 is effected after an interval of 60 microseconds, that is, 120 CLK cycles after detection of the end delimiter ED of the transmitted frame. This time is calculated in the implementation of the preferred embodiment, by summing 4 microseconds of delay time, which compensates for transceiver delay and through-the-air delay; followed by an extended interframe spacing time formed by two IFS (interframe spacing) times, each of 16 microseconds, a preamble (PR) time of 8 microseconds (corresponding to a 2-byte length preamble) and a jam time of 16 microseconds, corresponding to the length of the jam pattern produced after a (simulated) collision detection by the LAN controller 22. The IFS time and preamble time are programmed into the LAN controller 22. The extended interframe spacing time corresponds to the time at which the first backoff slot time commences. Referring to FIG. 5 and FIG. 7 (transmit mode) it will be seen that after the end delimiter (ED) detection, the 120 CLK cycle delay introduced by the delay circuit 360 causes the cyclic counter 350 to be reset at a time indicated in FIG. 7 by the dashed line 400. The pulses on the line 352 (FIG. 5) produced after ED detection are blocked by the stop sync logic circuit 354, as shown in FIG. 7. Thus, the next pulse on the line 242, applied to the antenna slot control circuit 200 (FIGS. 2 and 6) occurs at the time indicated by the dashed line 400.

When a station has received a data frame, as shown in the lower part of FIG. 7, the slot sync control circuit 240 is reset after an interval of 56 microseconds, that is, 112 CLK cycles, after the detection of the end delimiter ED of the received frame. Thus, the reset occurs without the aforementioned 4 microsecond delay included at the transmitting station. With this arrangement, it will be appreciated that the slot sync control circuits 240 of all the stations 12 in the LAN 10 are reset at precisely the same instant, as indicated by the dashed line 400 in FIG. 7.

Referring particularly to FIG. 6, it will be appreciated that it is ensured that the station 12 can only start a transmission at the beginning of an antenna slot interval. When the signal RTSB on the line 50 becomes active, representing a request-to-send signal provided by the signal generator circuit 40 (FIG. 2), then the signal on the line 242 applied to the sync start logic circuit 380 ensures that an output request-to-send signal RTSC on the line 220 is provided at the start of the next antenna slot interval, since the signal on the line 242 is also applied to the antenna switch control circuit 384. The transceiver 20 is controlled to the transmit mode, the antenna A is selected by a select signal on the line 228, and the transceiver 20 transmits the preamble (PR) start delimiter (SD) and network ID (NWID) of the data frame. The transceiver 20 also activates the signal CTSA on the line 48, causing the activation by the signal generator circuit 40 of the signal CTSB on the line 52, which causes the LAN controller to provide the user data for transmission in the data frame.

If the station 12 wishes to transmit (RTSA issued) when there is no carrier activity on the transmission channel (CRS inactive), then RTSC becomes active with a delay of from 0 to 40 microseconds, since the sync start logic circuit 380 provides the signal RTSC at the beginning of an antenna slot.

If the station 12 wishes to transmit when there is carrier activity (CRS active), then, as described hereinabove with reference to FIGS. 3A and 3B, when CRS becomes inactive, the signal generator circuit 40 causes the signal CDT to become active on the line 54, simulating a collision. The LAN controller 22 then waits for the aforementioned extended interframe spacing time of 56 microseconds, plus a random number (up to 63) of backoff slot time periods of 40 microseconds each. The cyclic counter 300 (FIG. 5) is reset 112 CLK cycles after the ED signal on the line 246 becomes active. This 112 CLK cycles delay matches the 56 microsecond interframe spacing time. Thus, the first possible instant (0 backoff slot times) at which RTSB can become active matches the first slot sync pulse on the line 242 after the reset of the cyclic counter 350. Similarly, if a different number, K of 40 microseconds backoff slot times is selected by the LAN controller 22, then RTSB is activated again substantially at the beginning of an antenna slot interval.

Thus, it will be appreciated that the described slot sync control circuit 240 and antenna slot control circuit 200 achieve the re-establishment of synchronization of the antenna switching, such that synchronization in all network stations 12 is achieved. Since transmission of a data frame can start only at the commencement of an antenna slot, this synchronization implies a minimum carrier detect time in receiving stations for non-deferred frames as well as for deferred frames which have been subject to backoff.

Figure 8A:
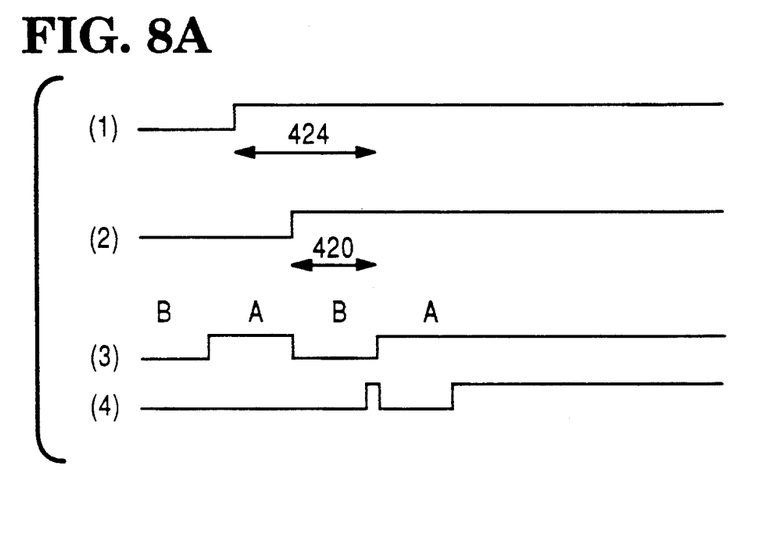
FIGS. 8A and 8B show waveforms illustrating carrier detect times and antenna selection.
Figure 8B:
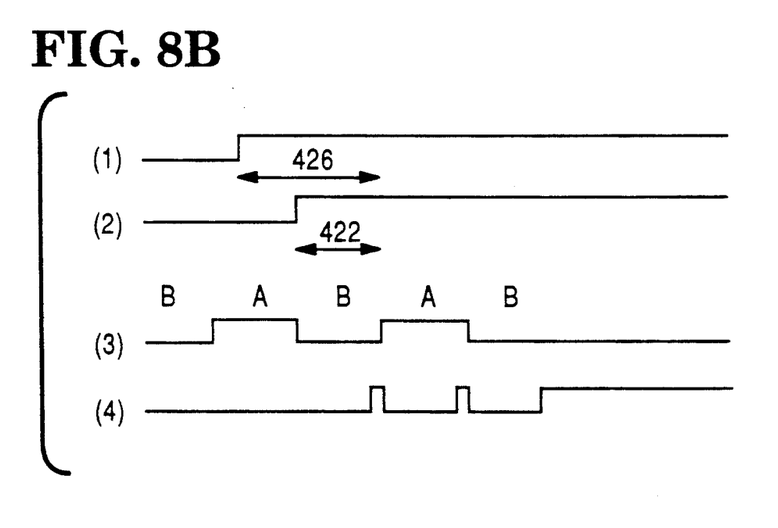

Referring to FIGS. 8A and 8B, waveforms (1) represent carrier activity on the transmission channel without the synchronzation provision described herein; waveforms (2) represent carrier activity in the transmission channel with the synchronization provision described herein; waveforms (3) represent the effective antenna A or B, as determined by the state of the switch 204 (FIG. 2); and waveforms (4) represent the detection of carrier activity in the transceiver 20. FIG. 8A represents the situation where it is determined in the transceiver 20 that antenna A is selected for reception of the received data frame, and FIG. 8B represents the situation where it is determined that antenna B is selected for reception of the received data frame. The selection of antenna A or antenna B may be based, for example, on a determination of which antenna provides the higher signal level during reception of the preamble of the data frame. It will be appreciated that the carrier detect times 420 and 422 (FIGS. 8A and 8B), where synchronization of the start of transmission with an antenna slot exists are shorter than the carrier detect times 424 and 426 where there is not such synchronization. Since a minimum carrier detect time (420 and 422) is achieved by the circuitry described herein, it will be appreciated that the risk of (real) collisions of data frames on the transmission channel is minimized, since a transmission is deferred if carrier activity is detected. This reduced risk of collisions assists in achieving a high throughput of data in the network 10.

It will be appreciated that, after a long period without carrier activity the synchronization of the stations 12 in the network 10 may be lacking, due to small differences between the frequencies of the local oscillators 250 (FIG. 2) in the various stations. However, after the first new transmission, this synchronization is re-established. Thus the carrier detect time is small at a high network load, achieving the aforementioned high throughput performance.

Modifications of the preferred embodiment are possible. Thus, frequencies higher than 3000 GHz, such as infrared frequencies, may be employed for the wireless transmission channel. Also, in the modified embodiment, more than two antennas may be employed.

To summarize this invention in claim-like language, it relates to a local area network station comprising:

transceiver means (20) to operate on a wireless electromagnetic wave transmission channel (hereinafter referred to as channel) having a plurality of antennas 14, 16);

communication control means operative when said channel is active to defer transmission of a data frame (referred to as a deferred data frame) for a random number of backoff time periods after the channel has become inactive;

antenna switch means (204) to select one of said plurality of antennas for operative connection to said transceiver means; and synchronizing means (200, 240) to control said antenna switch means to provide antenna slot periods having durations equal to said backoff slot time periods, and also to synchronize the start of data frame transmissions with the start of said antenna slot time periods.

The synchronizing means (200, 204) is resynchronized in response to the transmission of a said data frame and the reception of a said data frame by said transceiver means (20), and the sychronizing means (200, 204) includes:

antenna slot control means (200) to control said antenna switch means (204); and slot sync control means (240) to provide slot control pulses to said antenna slot control means.

The slot sync control means (240) includes:

cyclic counter means (350) to count clock pulses (CLK) and also to generate a count output pulse in response to each counting of a predetermined number of said clock pulses;

blocking means (354) to receive the count output pulses generated by said cyclic counter means;

said blocking means also having an output line (242) on which said slot control pulses are provided; and reset control means (360) to reset said cyclic counter means.

The reset control means (360) receives said clock pulses and is effective to generate a resetting signal to said cyclic counter means (350) after first and second predetermined time intervals depending upon whether said transceiver means (20) is respectively in a transmit mode or a receive mode.

The blocking means (354), is enabled to block said count output pulses in response to detection by said transceiver means (20) of the termination of a data frame and is disabled to pass said count output pulses in response to the generation of said resetting signal.

The communication controller means (22):

(a) defers transmission of said data frame in response to a first control signal (CRS) applied thereto;

(b) commences the transmission of the deferred data frame after said random number of backoff slot time periods in response to a second control signal (CDT) applied thereto; and (c) outputs a third control signal (RTSA) requesting transmission of a deferred data frame.

The local area network station also includes:

signal generating means (40) coupled to said communication controller means (22) to generate said second control signal (CDT) in response to said third control signal (RTSA); and said second control signal (CDT) being effective to cause said communication controller means (22) to inhibit transmission of the deferred data frame until after said random number of backoff periods.

The signal generator means (40) is effective to generate a fourth control signal (RTSB) requesting transmission of a data frame;

said fourth control signal (RTSB) being applied to said antenna slot control means (200); and said antenna slot control means being effective to generate a sixth control signal (RTSC) to initiate data frame transmission in synchronism with the initiation of one of said antenna slot time periods.

While the form of the invention shown and described herein is admirably adapted to fulfill the object primarily stated, it is to be understood that it is not intended to confine the invention to the form or embodiment disclosed herein, for it is susceptible of embodiment in various other forms within the scope of the appended claims.

What is claimed is:

1. A local area network station comprising:

transceiver means to operate on a wireless electromagnetic wave transmission channel, hereinafter referred to as channel, having a plurality of antennas;

communication control means operative when said channel is active to defer transmission of a data frame, referred to as a deferred data frame, for a random number of backoff slot time periods after the channel has become inactive;

said communication controller means including a CSMA/CD local area network (LAN) controller chip which is used in wired LANs, said controller chip using a simulated collision detect signal to initiate said backoff slot time periods;

antenna switch means to select one of said plurality of antennas for operative connection to said transceiver means; and synchronizing means to control said antenna switch means to provide antenna slot time periods having durations equal to said backoff slot time periods, and also to synchronize the start of said data frame transmissions with the start of said antenna slot time periods.

2. The local area network station as claimed in claim 1 in which said synchronizing means is resynchronized in response to the transmission of a said data frame and the reception of a said data frame by said transceiver means.

3. The local area network station as claimed in claim 2 in which said synchronizing means includes:

antenna slot control means to control said antenna switch means; and slot sync control means to provide slot control pulses to said antenna slot control means.

4. The local area network station as claimed in claim 3 in which said slot sync control means includes:

cyclic counter means to count clock pulses and also to generate a count output pulse in response to each counting of a predetermined number of said clock pulses;

blocking means to receive the count output pulses generated by said cyclic counter means;

said blocking means also having an output line on which said slot control pulses are provided; and reset control means to reset said cyclic counter means.

5. The local area network station as claimed in claim 4 in which said reset control means receives said clock pulses and is effective to generate a resetting signal to said cyclic counter means after first and second predetermined time intervals depending upon whether said transceiver means is respectively in a transmit mode or a receive mode.

6. The local area network station as claimed in claim 5 in which said blocking means, is enabled to block said count output pulses in response to detection by said transceiver means of the termination of a data frame and is disabled to pass said count output pulses in response to the generation of said resetting signal.

7. The local area network station as claimed in claim 5 in which said communication controller means:

(a) defers transmission of said data frame in response to a first control signal applied thereto;

(b) commences the transmission of the deferred data frame after said random number of backoff slot time periods in response to said simulated collision detect signal applied thereto; and (c) outputs a third control signal requesting transmission of a deferred data frame;

said local area network station also including:

signal generating means coupled to said communication controller means to generate said simulated collision detect signal in response to said third control signal; and said simulated collision detect signal being effective to cause said communication controller means to inhibit transmission of the deferred data frame until after said random number of backoff slot time periods.

8. The local area network station as claimed in claim 6 in which said signal generator means is effective to generate a fourth control signal requesting transmission of a data frame;

said fourth control signal being applied to said antenna slot control means; and said antenna slot control means being effective to generate a fifth control signal to initiate data frame transmission in synchronism with the initiation of one of said antenna slot time periods.

9. A method of transmitting data frames in a local area network including a plurality of local area network stations, each station comprising transceiver means adapted to operate on a wireless transmission channel and a plurality of antennas, including the steps of:

(a) determining, in each station, if said transmission channel is active and, if so, deferring transmission of a data frame by that station for a random number of equal duration backoff slot time periods after said transmission channel has become inactive through using a simulated collision detect signal in association with a CSMA/CD local area network (LAN) controller chip which is used in wired LANs;

(b) providing, in each station, switching means adapted to connect said antennas in turn to said transceiver means, each for an antenna slot time period equal to one of said backoff slot time periods; and (c) synchronizing said antenna slot time periods for all of said station in said network.

* * * * *